United States Patent [19]

Mapes et al.

[11] 4,368,062

[45] Jan. 11, 1983

[54] GLASSWARE FORMING SPEED CONTROL SYSTEM

[75] Inventors: Glenn H. Mapes; Jerome A. Kwiatkowski; J. David Haynes, all of Muncie, Ind.

[73] Assignee: Ball Corporation, Muncie, Ind.

[21] Appl. No.: 281,497

[22] Filed: Jul. 8, 1981

[51] Int. Cl.$^3$ .............................................. C03B 9/40
[52] U.S. Cl. .......................................... 65/29; 65/162; 65/163; 65/DIG. 13; 364/473; 364/476
[58] Field of Search ................... 65/29, 162, 163, 164, 65/DIG. 13; 364/473, 476

[56] References Cited

U.S. PATENT DOCUMENTS

| | | | |
|---|---|---|---|
| 3,162,038 | 12/1964 | Roberson et al. | 65/29 X |
| 3,372,017 | 3/1968 | Pitbladdo | 65/29 X |
| 3,630,707 | 12/1971 | Ayers | 65/162 |
| 3,954,433 | 5/1976 | Holler | 65/29 |
| 4,071,344 | 1/1978 | Blausey, Jr. | 65/163 X |
| 4,104,046 | 8/1978 | McCreery | 65/29 X |
| 4,108,623 | 8/1978 | Cárdenas-Franco | 65/29 X |
| 4,152,134 | 5/1979 | Dowling | 65/29 X |

Primary Examiner—Arthur D. Kellogg
Attorney, Agent, or Firm—Jenkins, Coffey, Hyland, Badger & Conard

[57] ABSTRACT

A method and apparatus for controlling the rate of operation of a glassware forming system including a temperature sensing device positioned in the blank and blow molds of an I.S. machine. The mean temperature over a period of time is derived for each of the molds. The mean temperature is compared to a predetermined optimum temperature. The optimum temperature is chosen to be the highest desirable temperature at which the corresponding molds should operate. In response to the comparison of the detected and optimum temperatures, the speed of the I.S. machine is varied to increase or decrease machine speed depending upon which the mean mold temperature is, greater than or less than the optimum temperature, respectively. However, before the speed is changed, if the detected and mean mold temperatures are greater than the optimum temperature, the amount of cooling air is increased until it reaches a maximum. When the cooling air flow about the molds reaches a maximum level and the detected mold temperature is still greater than the optimum mold temperature, the speed of the I.S. machine is reduced to permit cooling of the molds.

27 Claims, 8 Drawing Figures

GLASSWARE FORMING SPEED CONTROL SYSTEM

BACKGROUND OF THE INVENTION

This invention relates to a method and apparatus for optimizing the speed of a glassware forming process.

Glassware forming systems include a forehearth which contains a channel of molten glass from which a feeder bowl mechanism extends. The feeder mechanism forms gobs of molten glass from the forehearth and a distributor mechanism distributes the gobs to each of a plurality of blank molds in an I.S. machine. The gobs of molten glass are processed by the I.S. machine to form containers which were then placed on a takeout conveyor and carried to a lehr where the containers are annealed. In the past, the plunger in the feeder mechanism, the shears for cutting the molten glass to form gobs, the distributor mechanism and the I.S. machine were all operated by a motor drive system whose speed varied depending upon the type of glass being formed. Thus, small containers, such as baby food jars, are formed at a relatively rapid rate whereas large containers, such as gallon jugs, are formed at a relatively slow rate. Since the process of converting a gob of molten glass to a container is, in essence, a thermodynamic process of removing heat from the gob while shaping same in a controlled fashion, the speed of the glassware forming process is, in large part, dependent upon the ability of the I.S. machine to remove heat from the glass in a controlled manner. In the past, the speed at which glassware containers were formed was determined by an operator who depended upon his skill and training to determine the best speed for forming various types of glassware containers.

More recently, as disclosed in the copending U.S. patent application of Wood, Ser. No. 281,565, entitled "Programmable Speed Controller" and assigned to the common assignee herewith, a system is disclosed for controlling the speed of an I.S. machine, the gob distributor and the feeder mechanism by means of a direct computer control. This system has the advantage of providing more positive control of the glassware forming process and facilitates the control of the process. However, the speed with which the glassware forming process operates again is determined by, and hence is dependent upon, the training and experience of an operator.

There accordingly is a need in the art for an improved method and apparatus for controlling and optimizing the speed at which glassware containers are formed.

SHORT STATEMENT OF THE INVENTION

Accordingly, this invention relates to an improved method and apparatus for controlling and optimizing the speed of a glassware forming process. By the invention, the temperatures of the respective blank and blow molds of each section of an I.S. machine are detected and averaged with respect to time. Each mold temperature is then read and compared with an optimum mold temperature which is derived empirically. The optimum mold temperature is chosen to be the highest desired mean temperature at which the respective molds should operate. If the mold temperature is lower than the optimum mold temperature, the rate at which glassware containers is formed is increased. When the mold temperature exceeds the optimum mold temperature, cooling air to the respective sections is increased until it reaches the maximum level. When the maximum level is reached and the mold temperature remains greater than the optimum temperature, the rate of formation of glass containers is decreased to permit cooling of the molds.

In order to permit uniform operation of each of the sections of an I.S. machine at a fixed rate, the rate at which glassware containers are formed is never increased above that level which causes the hottest running molds to reach the optimum temperature level.

In an alternate embodiment of the invention, upon reading the average mold temperatures for each of the blank and blow molds for the respective I.S. sections, a computation is performed to determine how much each section can increase in speed. Then the speed for all the I.S. sections is uniformly increased to the level of the minimum calculated speed increase.

BRIEF DESCRIPTION OF THE DRAWINGS

Other objects, features and advantages of the present invention will become more fully apparent from the following detailed description of the preferred embodiment, the appended claims and the accompanying drawings in which:

DETAILED DESCRIPTION OF THE PREFERRED EMBODIMENTS

Figure 1:
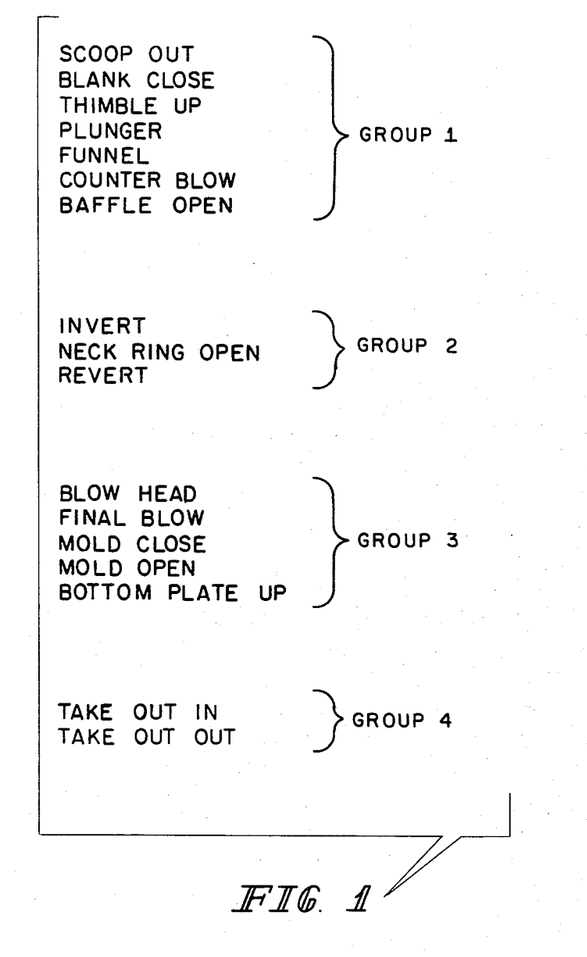
FIG. 1 is a schematic breakdown into groups of the functions of a glassware forming machine cycle.

Refer now to FIG. 1 where there is schematically illustrated a typical glassware forming cycle and its sequence. The functions performed by the I.S. machine are divided into four thermodynamic groups. The first group of functions result in the formation of a partially formed container called a parison. The second group of functions transfers the parison to the blow mold. The third group of functions converts the parison into a container and the fourth group of functions transfers the container to a conveyor for transport to the annealing lehr.

The first group includes the function of moving the scoop out to receive a gob of molten glass which is followed by closing the blank mold so that it can receive the gob of glass being distributed. A funne for directing the gob of molten glass into the blank mold is moved down onto the blank mold after which the gob arrives and is directed into the blank mold. Subsequently, the plunger and thimble move upwardly to form the mouth and finish of the glass container. Air is then blown into the top end of the blank mold to force the gob of molten glass down into the neck of the mold and about the thimble. In this manner, the finish of the glass container is formed. The funnel is then removed and air is counter-blown into the blank mold to form a parison which is a partially shaped glass container. The blank mold is then opened to complete the process of forming the parison which is the objective of the group one functions.

With respect to the group two functions, the invert arm transfers the parison to the blow mold after which the neck ring is opened permitting the invert arm to revert to its original position with the parison now positioned in the blow mold. The group two functions take a relatively constant period of time and, accordingly, in the present invention, they are not speed adjusted during the operation of the I.S. machine. It should be understood, of course, that the rate of rotation of the invert arm is critical to preventing distortion of the parison and, accordingly, the speed of the invert operation will depend upon the type of container being formed and, of course, ambient conditions.

The group three functions include the positioning of the blow head about the neck or finish of the parison to retain it in position and to permit air to be blown into the internal chamber formed by the parison. When the blow head has been placed in position, the final blow step occurs which causes the parison to force outwardly against the mold cavity walls to form the final shape of the container. After a period of time, the blow mold is opened and the bottom plate upon which the container is positioned moves up to permit the take-out arms to grasp the neck. When the container has been removed by the take-out arm, the bottom plate is returned to its normal position. At the completion of the group three functions, the parison has been converted to a fully formed container. Next, in group four, the tongs of the take-out arm are positioned about the neck of the container and the container is moved onto a dead plate where it is briefly cooled after which the container is moved onto a conveyor for transportation to the lehr by a wipe-out arm.

It should be appreciated that the aforementioned steps are typically involved in the making of glassware containers. However, there may be other steps in the glassware container forming process such as would be experienced in a press and blow operation as opposed to the aforementioned blow and blow operation. Further there may be additional steps such as cracking the blank or blow mold which are used in the manufacture of some containers but not others. Those of ordinary skill in the art would readily appreciate these variations depending upon the type of I.S. machine being utilized and the type of container being manufactured.

Figure 2A:
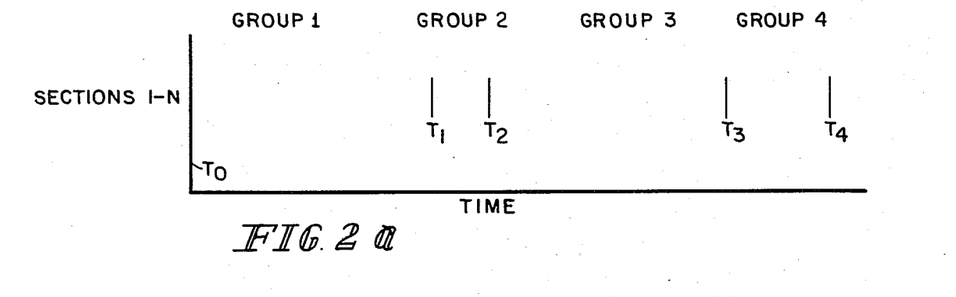
FIG. 2a is a graphical display of the relative time of operation for each of the groups of functions illustrated in FIG. 1.
Figure 2B:
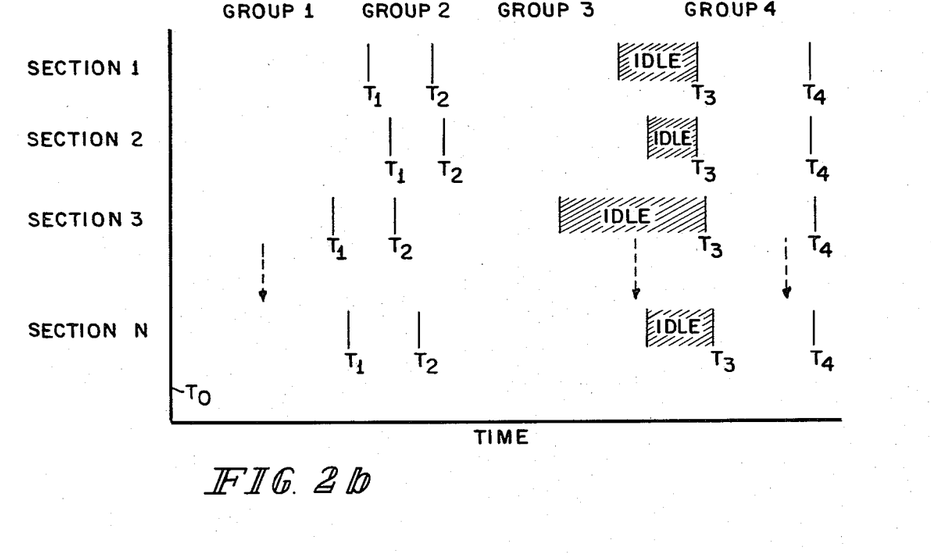
FIG. 2b is a graphical display of the variation in the relative times of operation from section to section in a glassmaking machine for each of the groups of functions illustrated in FIG. 1 and of the idle times resulting from the decreased times for completing the group 1 and group 3 functions.
Figure 2C:
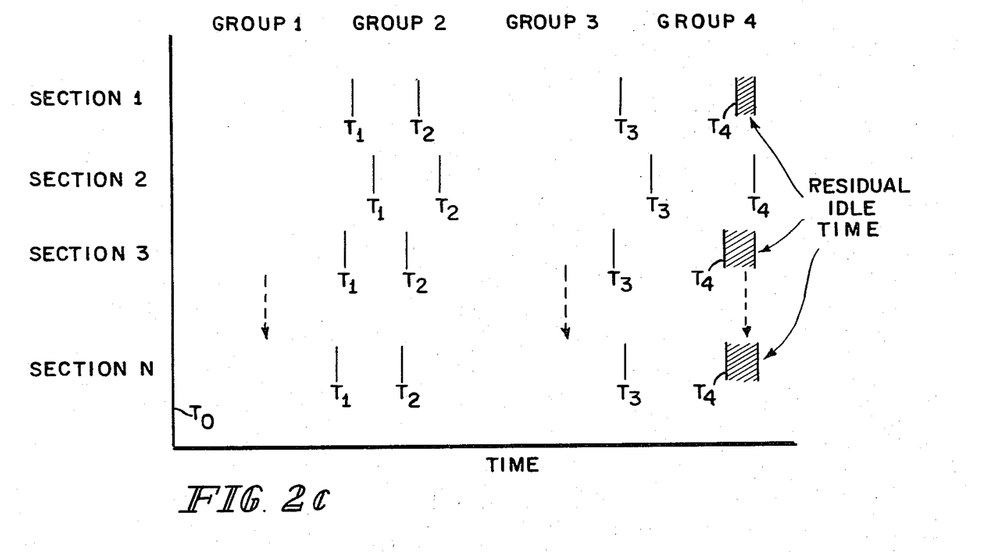
FIG. 2c is a graphical display of the times for completing a cycle of machine operation decreased by the minimum idle times corresponding to FIG. 2b.

Refer now to FIGS. 2a, 2b, and 2c which are simplified illustrations of time sequences in a cycle of operation of various sections of the I.S. machine. As illustrated in FIG. 2a, the group one functions take a relative period of time $T_1$ to be completed. The group two functions take a much shorter period of time equal to the difference between $T_2$ and $T_1$. The group three functions take a longer period of time and finally the group four functions take a relatively short period of time to be completed. Now assume, for example, that the group one functions and the group three functions can be completed in a shorter period of time than initially thought. This might be a result of increased cooling air flowing about the blank and blow molds, cooler and drier ambient air conditions or less heat being transferred from the molten glass to the molds because of a smaller amount of material in the gobs. Depending upon the cleanliness of the respective molds in each section of the machine, the location of the various sections with respect to the forehearth and other ambient factors, it may not be possible to decrease the time for completing the group one and group three functions an identical amount for each of the sections of an I.S. machine. Illustration 2b shows a typical example of how a decrease in the time to complete the group one and/or group three functions might vary from section to section. For section one, the time for completing both the group one and group three functions has been decreased leaving an idle time before the take-out arm positions the formed container onto the dead plate. In section two, only the time for completing the group one functions has been decreased and, accordingly, the idle time is shorter than that of section one. Similar variations in the time for completing the group one and group three functions for other sections may occur as illustrated.

In order to maintain synchronization of the system so that formed containers are positioned onto the conveyor in appropriate sequence, the time at which the group four functions are initiated, i.e., $T_3$, is the same for each section of the I.S. machine. Accordingly, in one embodiment of the invention, an initial determination is made of how much the time required to complete the group one and group three functions can be reduced for each section. Based on this, the time for completion of the first three groups is determined. The difference between time $T_3$ and the calculated time is called the idle time which is illustrated in FIG. 2b. The idle time, of course, is the result of the decreased time for completing the group one and group three functions. The time for beginning the group four functions is then advanced by an amount equal to the minimum idle time for all the sections. With reference to FIG. 2b, this would be the idle time for section two. It can be seen that if the time for beginning the take-out function of group four began earlier than the beginning of the shortest idle time, the containers would not be placed on the conveyor belt in the proper sequence.

Assuming now that the time required for completing a cycle of machine operation has been decreased by the same amount as the idle time for section two, the group timing operation of the I.S. machine would be as illustrated in FIG. 2c. Thus, with reference to FIG. 2c, section two would have no residual idle time and the operation of the section two cycle would be completed at a time earlier than for the original machine set up. However, with respect to section one and section three and section N, as illustrated, there would be a small residual idle time remaining due to the fact that the time for completing the group one and group three functions of section two could not be reduced as much as for these sections. In the preferred embodiment, this residual idle time is limited to a predetermined level so that damage to the container does not result because of non-controlled cooling of the container at the I.S. machine instead of in the lehr. This maximum permissible residual idle time duration can be determined empirically by one of ordinary skill in the art or, if desired, it can be limited to, for example, 5% of the total cycle time or, if the the machine operation is viewed in terms of degrees, the maximum idle time could be limited to 18° out of a 360° cycle.

Figure 3:
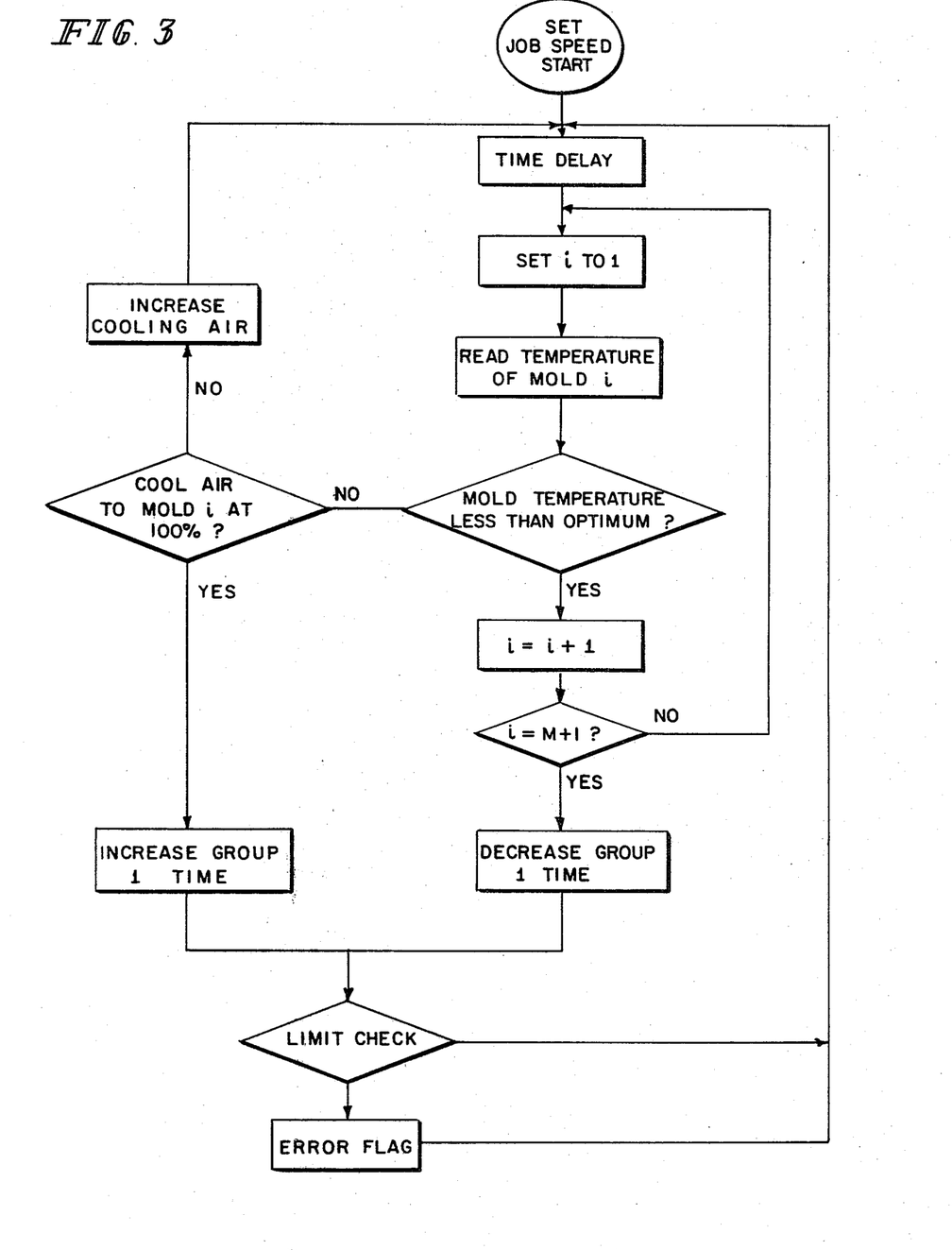
FIG. 3 is a functional display of the process for determining the optimum speed for an individual section.

Turn now to FIG. 3 which is a functional schematic illustration of one embodiment of the process for minimizing the operational time for the group one functions in an I.S. machine having blank molds. At the outset, the job speed is set for the I.S. machine at a speed which is dependent upon the ambient temperature and the size container being formed. As aforementioned, the larger the container being formed the slower the machine speed because greater quantities of heat have to be removed from the molten glass. Preferably, the job speed is set based upon past history of job speeds for the type of container being formed and ambient temperature conditions. However, if the particular job has never been run before, the machine speed is set on a trial basis.

Once the job speed is set, there is provided a time delay in order to bring the blank molds for each of the individual sections up to temperature. It is, of course, appreciated that the heat transfer between the gobs of molten glass and the blank mold and the dissipation of heat by the mold is a complex physical phenomenon. See, for example, the thermodynamic computations of Petropoulos, et al., in an article entitled "Heat Transfer Through Glass and Mold During the Glass Forming Process", Glass International, September 1979. Since the temperature of various locations of the mold changes radially during the glass forming cycle, it is preferred that a temperature probe be located at a centralized location in the blank mold and that the temperature value be averaged with respect to time over several cycles to obtain a mean temperature value for the mold. For this reason, there is provided a time delay so that the effect of any changes in conditions such as increased or decreased flow of cooling air about the mold or increased or decreased machine speed can be stabilized before a new temperature determination is made.

The mean blank mold temperature is read and then compared with the optimum mean temperature for the mold. The optimum temperature level is determined empirically for each mold type and preferably is the highest temperature at which the mold can reliably form good parisons. If the mean mold temperature exceeds the optimum mold temperature level, increased cooling air is supplied to the I.S. section. After a time delay of several cycles to permit the mean mold temperature to stabilize, the mean temperature of the mold is again determined and compared with the optimum temperature level. If the cooling air is turned on to the maximum level and the mean mold temperature level is still greater than the optimum mold temperature, the time for completing the group one functions is increased to thereby permit greater time for the mold to cool due to heat transfer from the mold. When the time for completing a group one function is increased or decreased, a limit check is always made to assure that the time required to complete the group one functions is not increased to such a point that it interferes with the group two functions or the sequential oeration of the other sections or that it is not decreased to the point where a proper finish and/or parison cannot be formed. If the change of speed increases or decreases beyond a predetermined point, an error flag is raised and coupled back to the console to prevent further change in the time for completion of the group one functions.

Preferably, the cooling air is selectably and automatically adjustable to each mold in this embodiment. However, as it has been found that all molds react very similarly to any change in ambient conditions or machine speed, satisfactory results may be obtained by manually adjusting the cooling air for relative differences between the molds, such as would result because of the position of the mold in the machine, and then controlling the overall cooling system in accordance with this invention.

Assume now that the mold temperature is less than the optimum temperature. In this case, the time for completing the group one functions can be decreased and, accordingly, the timing of the group one functions is uniformly advanced by a predetermined increment which, in the preferred embodiment, is an increment of one percent of the total time for completing the group one functions. Thus, the timing is modified to decrease the time for completion of the group one functions, i.e., to increase the speed of forming the parison. After a time delay of several cycles, the mold temperature is again read and if the mold temperature still is less than the optimum temperature, the time for completion of the group one functions is advanced by another increment of one percent of the time for completing the group one functions. This operation continues until the mean mold temperature approaches or equals the optimum mold temperature at which time the machine is operating to form parisons at a maximum or optimum rate.

The same process as that illustrated in FIG. 3 is conducted to determine the maximum speed for the group three functions and, accordingly, the steps for incrementally increasing the speed or decreasing the time duration for the group three functions is not illustrated in the drawings.

Figure 4:
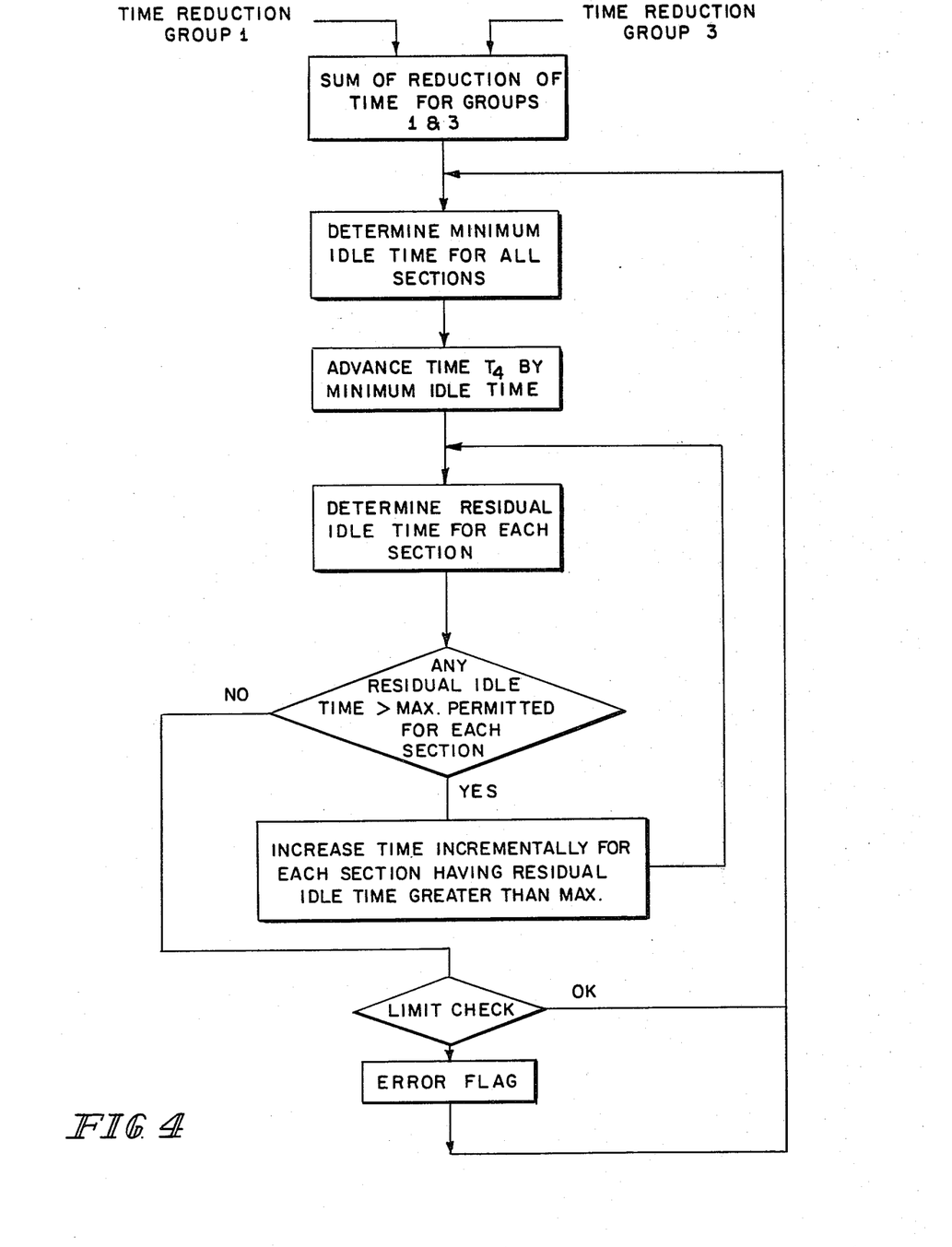
FIG. 4 is a functional display of the process for optimizing speed for a plural section I.S. machine.

As illustrated in FIG. 4, the change in speed for performing the group one and group three functions are summed for each individual section of the I.S. machine. These values correspond to the idle times illustrated in FIG. 2. The minimum idle time is then determined and the time in each cycle for beginning the group four functions is advanced by the aforementioned minimum idle time. As illustrated in FIG. 2c, there may be some residual idle times for various sections of the I.S. machine. These idle times are checked with respect to the maximum permissible idle time which, as aforementioned, preferably is five percent of total cycle time or 18° in the machine cycle. If an idle time exceeds this limit for any given section, the total time for completing the group one and group three functions is increased by 1% until the idle time is decreased sufficiently to come within the limit check.

The actual change in machine timing can be accomplished by the system disclosed in the copending U.S. patent application of Wood, Ser. No. 281,565, which discloses a programmable speed controller wherein the speed is controlled by a computer. The speed of operation of the plunger mechanism, the shears and the gob distributor is increased by a percentage which depends upon the ratio of the decrease in time for completion of the group functions to the total machine cycle time. The time at which each of the group one and group three functions occur is changed by changing the time with respect to a reference time when each of the functions in the group one and group two are to be actuated. The group two and group four functions operate at the same rate as during machine set up, however, the time in the cycle at which they occur is advanced depending upon the changed timing of the group one and the group three functions.

Figure 5:
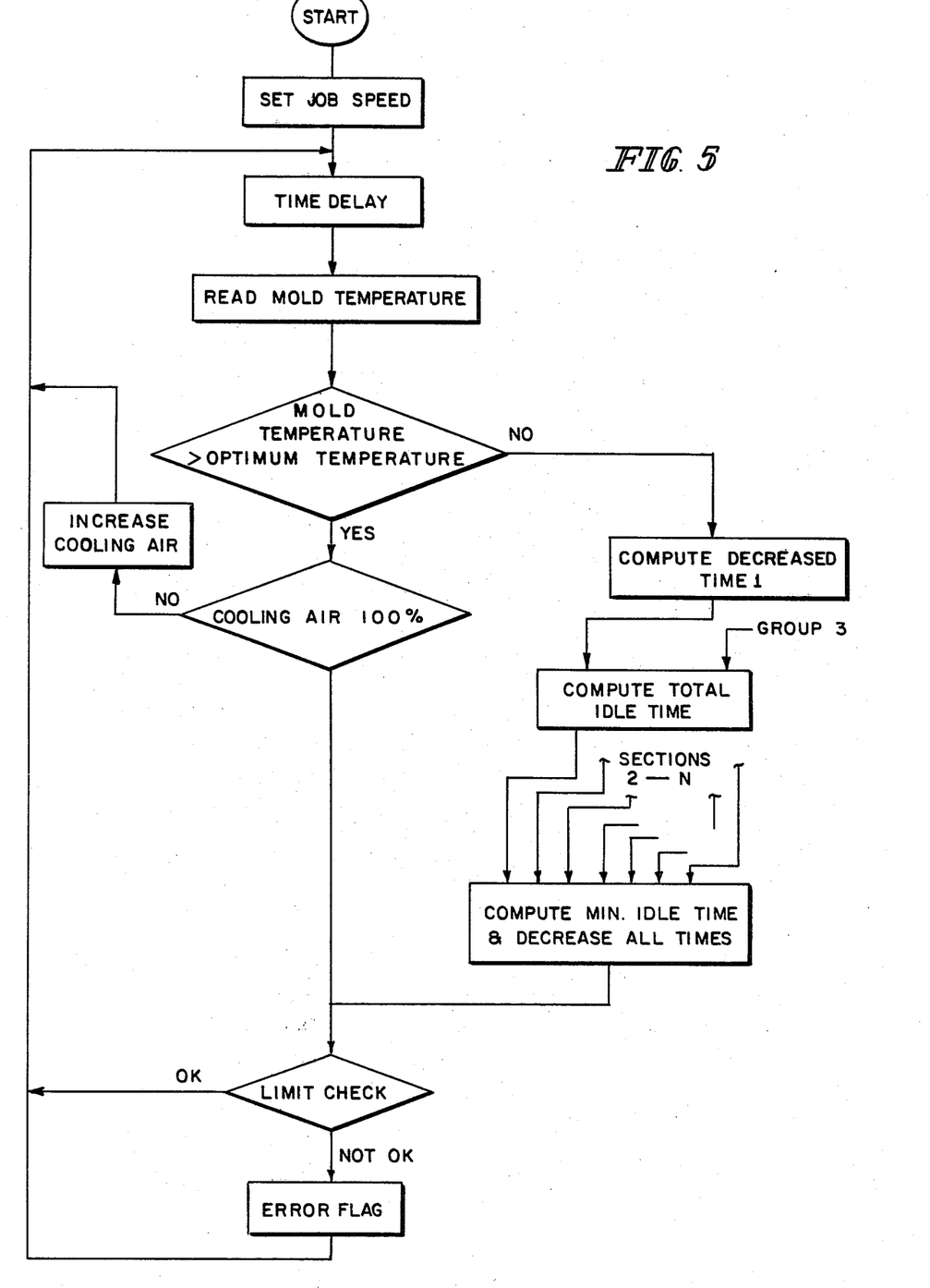
FIG. 5 is a functional display of an alternate embodiment of the present invention.

Refer now to FIG. 5 where there is illustrated an alternate embodiment of the present invention. As in the case of the preferred embodiment, at machine start up an initial speed is established for the I.S. machine depending upon ambient temperature conditions and the type of container being formed. Following the start up procedure, the mean mold temperature is determined by means of a probe positioned in both the blank and blow molds for each section of the I.S. machine. Taking the case of the first section of the I.S. machine, the mean blank mold temperature as well as the mean blow mold temperature is compared with a selected optimum temperature level for these molds. Should either the blank mold or blow mold temperatures be below the optimum temperature level, a calculation is then performed to determine how much the group one and/or group three times can be reduced. This computation is performed by establishing a table which correlates the difference between the mean mold temperature and the optimum temperature to the amount of time the completion of the corresponding group of functions can be shortened. This table is derived empirically based upon prior experience and varies for each type of container being formed as well as the type of I.S. machine being used, i.e., single gob, double gob or triple gob machines. The computed time by which the group one and/or group three functions can be shortened is stored and, in the meantime, similar computations are made with respect to each of the other sections of the I.S. machine.

When each of the computations have been completed, which, of course, only takes a mere fraction of any given machine cycle, a determination is made as to what is the minimum time, i.e., idle time, by which the performance of the group one and group three functions can be reduced for any section. When this time is determined, the rate of operation of the plunger mechanism, gob shears and distributor is increased by a rate proportionate to the ratio of the minimum idle time to the total machine cycle time.

In the meantime, for each section of the I.S. machine, a comparison is made of the relative calculated reduction in time for completing each of the group one and group three functions with the relative minimum reduction in time previously calculated for the I.S. machine. If both the group one and group three functions for a section can be completed in less than the computed minimum idle time, then the timing for both the group one and group three functions is changed so that both the group one and group three functions can be completed in a time less than the originally set time; the total reduction in time being equal to the minimum idle time. Should, however, the group one functions require, for example, the full time duration initially established, then the group three functions will have their timing changed to reflect an even greater speed increase so that the total cycle time required to complete the group one, two and three functions is less than that originally established for the machine by an amount equal to the minimum idle time.

As an example, assume that the calculated minimum idle time is 15% of the total machine cycle time thus indicating that the I.S. machine speed can be increased by 15%. Further, assume that for section one, both the group one and group three functions can be completed 18% sooner than originally established during job set up. In accordance with the present invention, the time to complete both the group one and group three functions will be reduced by 15% rather than the 18% calculated since the total time reduction must not be more than 15% of the total machine cycle time. Now assume for the second section that the group one functions can be completed 10% sooner than originally established and the group three functions can be completed 20% sooner than originally established. The speed of the group one functions will not be increased by 15% but rather only 10%. If the group one functions were completed at a rate higher than the aforementioned 10% increase in speed, the blank mold or molds would overheat thus providing defective glassware containers. However, overall machine cycle time can still be reduced 15% because the time for completing the group three functions can be reduced by up to 20%. Thus, the overall time for completion of the group one and group three functions is reduced by 15% over the initially established time. At the same time that the timing for the group one and group three functions is changed to reflect the increased machine speed, the time for initiation of the group four functions is advanced in the example to permit completion of a cycle 15% faster while at the same time maintaining the take-out operation for each of the individual sections in synchronism with one another.

Following the change of speed for the I.S. machine and after a time delay of several cycles, the temperature of the respective blank and blow molds for each of the I.S. sections is again determined and compared with the optimum mold temperatures for these respective molds. If these comparisons again show that machine speed can be increased further, the aforementioned procedure is repeated. Should, however, the computations indicate that at least one mold is running at a higher mean temperature than the optimum mean temperature, a computation from the aforementioned table is made to determine how much the machine speed should be decreased. Following this computation, the I.S. machine timing is modified for each of these sections to reflect a decreased machine speed or an increased cycle time to permit cooling of the hot mold down to the optimum mean temperature level; this being done in accordance with the process illustrated in FIG. 5.

An important advantage brought about by the present invention is the ability to operate an I.S. machine at the optimum speed for any type of ambient temperature and humidity conditions. Because of this, glassware containers can be produced at the fastest possible rate consistent with the production of good glass containers. Thus, the pack rate, i.e., machine efficiency, is maintained or increased while the total machine speed, i.e., rate of production of glass containers, is increased.

Figure 6:
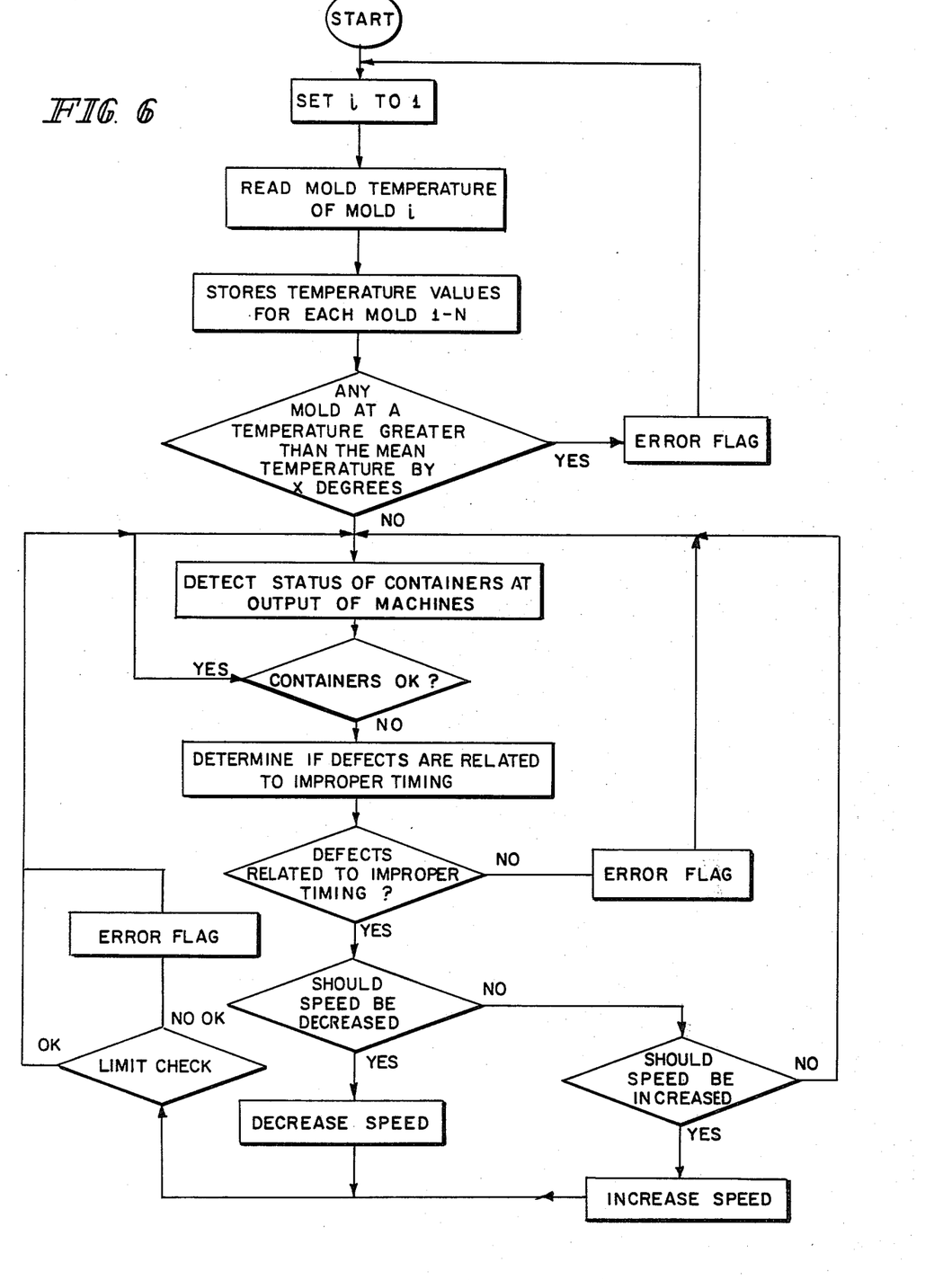
FIG. 6 is an alternate embodiment of the invention illustrating a mold status detection process and a speed-limit process for a plural section I.S. machine.

The present system can be utilized to determine the existence of defective molds, i.e., molds which are too dirty or do not have the heat transfer characteristics desired. Thus, as illustrated in FIG. 6, a limit check process is conducted to determine whether any given blank mold or blow mold is operating at a substantially hotter temperature than the other blank or blow molds. If it is determined that one of the molds is operating significantly hotter than the other molds, an indication thereof will be presented on the console so that the operator can, if desired, replace the mold. In this manner, not only is machine speed increased but also the likelihood of defective ware is decreased because a constant limit check is being run to determine which molds are running at an unusually high temperature compared to the other molds.

Further, in accordance with the present system as illustrated in FIG. 6, improper relative timing can be corrected. Thus, in accordance with FIG. 6, defects in the container as it is positioned on the dead plate or conveyor are detected. It is well-known in the art that certain defects are related to improper timing of the I.S. machine. For example, if the container sags, it indicates that there has been insufficient blow time in the group three functions. The detected sag condition is conveyed to the controller which then changes the blow time by a predetermined increment. This incremented change continues until the defect is corrected or a limit flag is generated indicating that the blow time has exceeded or reached a predetermined maximum duration. A warning is then indicated to permit manual correction. Should the change, for example, in blow time cause the duration of the group three functions to extend beyond the time $T_3$ at which the group four functions begin, then machine speed is decreased permitting the group four functions to begin at a later time.

There, of course, are other fault indicators which correspond to improper timing. Each of these are stored in the controller and when a defect corresponds to improper timing of any given function, the function timing is changed as aforementioned.

One bottle inspection system which can be used in accordance with the present invention is disclosed in the copending application of Daudt, et al., Ser. No. 281,467, filed on even date herewith. This application which is assigned to the common assignee herewith is incorporated herein by reference thereto.

While the aforementioned invention has been described in connection with the preferred embodiments thereof, it should be appreciated that other embodiments of the invention may be developed which fall within the spirit and scope of the invention as defined by the following claims.

What is claimed is:

1. A speed control system for controlling the rate of operation of a glassware forming system comprising:
   means for detecting the temperature of at least one mold of said glassware forming system;
   means for comparing said temperature with a predetermined optimum temperature, said optimum temperature being chosen to be the highest desirable temperature at which said at least one mold should operate; and
   means responsive to said comparing means for increasing the speed of said glassware forming system when said detected temperature is less than said optimum temperature.

2. A speed control system for a glassware forming system, said glassware forming system including a machine having a plurality of molds for forming glassware containers from molten glass, said system comprising:
   means for detecting the mean temperature of at least one mold of said glassware forming system, said mean temperature being the average temperature of said mold over at least one machine cycle;
   means for comparing said mean temperature of said at least one mold with a predetermined optimum temperature level, said optimum temperature level being chosen as the highest desirable mean temperature at which said at least one mold should operate; and
   means responsive to said comparing means for increasing the speed of said glassware forming system when said detected temperature is less than said chosen optimum temperature.

3. The speed control system of claim 2 further comprising an air conditioning system including:
   means for directing air about said at least one mold; and
   means for controlling the flow of air about said at least one mold when said mean temperature varies from said optimum temperature.

4. A speed control system for a glassware forming system, said glassware forming system including a plurality of sections each having molds for forming glassware containers from molten glass, each of said sections operating in an interdependent timed sequence with respect one another, said system comprising:
   means for detecting the mean temperature of at least one mold of each of said sections, said mean temperature being an average temperature of said molds over at least a machine cycle;
   means for comparing said detected mean temperature of said at least one mold for each of said sections with a predetermined optimum temperature level, said optimum temperature level being chosen as the highest desirable mean temperature at which said at least one mold for each of said sections should operate; and
   means responsive to said comparing means for increasing the speed of said glassware forming system a predetermined amount when said detected temperature for each of said at least one mold for each section is less than said chosen optimum temperature.

5. The speed control systems of claim 4 further comprising:
   means for forcing cooling air about each of said molds for each of said sections; and
   means responsive to said comparing means for individually increasing the flow of air about the molds of each of said sections when the detected temperature of the at least one mold in a section is greater than said predetermined optimum temperature level.

6. A speed control system for a glassware forming machine comprising:
   means for detecting the mean temperature of at least one mold of each of a plurality of sections of said machine;
   means for comparing said mean temperature of each of said at least one mold in each section with a predetermined optimum temperature level, said optimum temperature level being chosen as the highest desirable mean temperature at which said at least one mold should operate;
   means responsive to said comparing means for determining how fast said machine speed for each of said sections can increase before said molds reach said optimum temperature level;
   means for determining the least amount by which the speed of any one of said sections can increase; and
   means responsive to said least amount determining means for increasing the speed of said glassware forming system by said least amount.

7. A speed control system for a glassware forming system comprising:
   means for detecting the mean temperature of at least one mold of said glassware forming system over a machine cycle;

means for comparing said mean temperature of said at least one mold with a predetermined optimum temperature level, said optimum temperature level being chosen as the highest desirable mean temperature at which said at least one mold should operate; and means responsive to said comparing means for increasing the speed of said glassware forming system when said detected temperature is less than said chosen optimum temperature and for decreasing the speed of said glassware forming system when said detected temperature is greater than said chosen optimum temperature level.

8. A speed control system for a glassware forming system, said glassware forming system including a plurality of sections each having molds for forming glassware containers from molten glass, each of said sections operating in an interdependent timed sequence with respect to one another, said system comprising:

means for detecting the mean temperature of at least one mold of each of said sections, said mean temperature being an average temperature of said molds over at least a machine cycle;

means for comparing said detected means temperature of said at least one mold for each of said sections with a predetermined optimum temperature level, said optimum temperature level being chosen as the highest desirable mean temperature at which said at least one mold for each of said sections should operate;

means responsive to said comparing means for determining the minimum time required to complete a series of functions in the formation of said glassware containers by each individual section;

means responsive to said minimum time determination means for each section for determining of the respective minimum times the maximum time required to complete said group of functions for said glassware forming system; and means responsive to said maximum time determining means for varying the speed of said glassware forming system to equal said maximum determined time duration.

9. A speed control system for a glassware forming system, said glassware forming system including a plurality of sections each having molds for forming glassware containers from molten glass, each of said sections operating in an interdependent timed sequence with respect to one another, said system comprising:

means for detecting the temperature of at least one mold of each of said sections;

means for comparing said detected temperature of said at least one mold for each of said sections with a predetermined optimum temperature level, said optimum temperature being chosen as the highest desirable temperature at which said at least one mold for each of said sections should operate; and means responsive to said comparing means for varying the speed of said glassware forming system at a predetermined amount when said detected temperature for each of said at least one mold for each section is less than said chosen optimum temperature.

10. A speed control system for a glassware forming system, said glassware forming system including a plurality of sections each having at least one blank mold and at least one blow mold for forming glassware containers from molten glass, each of said sections operating in an interdependent timed sequence with respect to one another, said system comprising:

means for detecting the temperature of at least one blank mold and at least one blow mold for each of said sections;

means for comparing said detected temperatures of said at least one blank mold and said at least one blow mold for each of said sections with predetermined corresponding optimum temperature levels, said optimum temperature levels for said blank and blow molds being chosen as the highest desirable temperature at which said blank and blow molds should respectively operate;

means responsive to said comparing means for detecting the change in time required to process said molten glass in said blank and blow molds in response to the comparison of said detected temperatures and said optimum temperatures; and means responsive to said determining means for varying the speed of said glassware forming system in response to the determined change in time for processing said molten glass in said blank and blow molds.

11. A speed control system for a glassware forming system, said glassware forming system including a plurality of sections each having blank and blow molds for forming glassware containers from molten glass, said molten glass being converted to a parison in said blank mold by performing a first group of functions, said parison being formed into a glassware container in said blow mold by a second group of functions and said glassware container being positioned for transportation to an annealing lehr by a third group of functions wherein each of said sections operates in an interdependent timed relationship with respect to one another, said system comprising:

means for detecting the mean temperature of at least on blank mold and one blow mold for each of said sections, said mean temperatures being an average temperature of said blank and blow molds over at least one machine cycle;

means for comparing said detected mean temperature of said at least one blank mold and said at least one blow mold for each of said sections with a predetermined corresponding optimum temperature level for said blank and blow molds, said optimum temperature levels being chosen as the highest desirable mean temperature at which said at least one blank and blow mold for each of said sections should operate;

means responsive to said comparing means for detecting the minimum time required to complete said first and second groups of functions; and means responsive to said determining means for varying the speed of said glassware forming system by an amount corresponding to the relative change in timing required to complete said first and second groups of functions.

12. The speed control system of claim 11 further comprising:

means for detecting faults in said glassware container resulting from improper timing of said functions; and means for varying the timing of said functions in response to said detecting means.

13. The speed control system of claim 12 further comprising means for varying the speed of said glassware forming system in response to any change of time duration for completing said first or second group of functions resulting from said timing varying means.

14. A speed control system for controlling the rate of operation of a glassware forming system comprising:
   means for detecting the temperature of at least one mold of said glassware forming system;
   means for comparing said temperature with a predetermined optimum temperature, said optimum temperature being chosen to be the highest desirable temperature at which said at least one mold should operate;
   means responsive to said comparing means for increasing or decreasing the speed of said glassware forming system when said detected temperature is less than or greater than said optimum temperature, respectively;
   means for detecting faults in glassware containers formed by said glassware forming system resulting from the improper speed of said glassware forming system; and
   means for varying the speed of said glassware forming system in response to said detecting means.

15. A speed control system for a glassware forming system, said glassware forming system including a plurality of functions each having molds for forming glassware containers from molten glass, said glassware containers being formed by a series of functions each being timed with respect to one another, each of said sections operating in an interdependent timed sequence with respect to one another, said system comprising:
   means for detecting the mean temperature of at least one mold of each of said sections, said mean temperature being an average temperature of said molds over at least a machine cycle;
   means for comparing said detected mean temperature of said at least one mold for each of said sections with a predetermined optimum temperature level, said optimum temperature level being chosen as the highest desirable mean temperature at which said at least one mold for each of said sections should operate;
   means responsive to said comparing means for increasing the speed of said glassware forming system a predetermined amount when said detected temperature for each of said at least one mold for each of said sections is less than said chosen optimum temperature;
   means for detecting faults in said glassware container resulting from improper timing of said functions; and
   means for varying the timing of said functions in response to said detecting means.

16. The speed control system of claim 15 further comprising means for varying the speed of said glassware forming system in response to any change of time duration for completing said first or second group of functions resulting from said time varying means.

17. The speed control system of claims 1, 2, 4, 6, 7, 8, 9, 10, 14 and 15 further comprising:
   limit means for detecting when the speed of said glassware forming system is greater than a predetermined level; and
   means responsive to said limit means for indicating a fault condition when said speed level is exceeded.

18. A method for controlling the rate of operation of a glassware forming system comprising the steps of:
   detecting the temperature of at least one mold of said glassware forming system;
   comparing said temperature with a predetermined optimum temperature, said optimum temperature being chosen to be the highest desirable temperature at which said at least one mold should operate; and
   increasing in response to said comparing step the speed of said glassware forming system when said detected temperature is less than said optimum temperature.

19. In a glassware forming system having a machine with a plurality of molds for forming glassware containers from molten glass, the method of controlling the speed thereof comprising the steps of:
   detecting the mean temperature of at least one mold of said glassware forming system, said mean temperature being the average temperature of said mold over at least one machine cycle;
   comparing said mean temperature of said at least one mold with a predetermined optimum temperature level, said optimum temperature level being chosen as the highest desirable mean temperature at which said at least one mold should operate; and
   increasing in response to said comparing means the speed of said glassware forming system when said detected temperature is less than said chosen optimum temperature.

20. The method of claim 19 further comprising the steps of:
   directing cooling air about said at least one mold; and
   controlling the flow of air about said at least one mold when said mean temperature varies from said optimum temperature.

21. In a glassware forming system including a plurality of sections each having molds for forming glassware containers from molten glass, each of said sections operating in an interdependent timed relationship with respect to one another, a speed control method comprising the steps of:
   detecting the mean temperature of at least one mold for each of said sections, said mean temperature being an average temperature of said molds over at least a machine cycle;
   comparing said detected mean temperature of said at least one mold for each of said sections with a predetermined optimum temperature level, said optimum temperature level being chosen as the highest desirable mean temperature at which said at least one mold for each of said sections should operate; and
   varying in response to said comparing step the speed of said glassware forming system a predetermined amount when said detected temperature for each of said one mold for each section is different from said chosen optimum temperature.

22. The method of claim 21 further comprising the steps of:
   forcing cooling air about each of said molds for each of said sections; and
   individually increasing in response to said comparing step the flow of air about the molds of each of said sections when the detected temperature of the at least one mold in a section is greater than said predetermined optimum temperature level.

23. A method of controlling the speed of a glassware forming system comprising the steps of:
   detecting the mean temperature of at least one mold for each of a plurality of sections of said machine;

comparing said temperature of each of said at least one mold in each section with a predetermined optimum temperature level, said optimum temperature level being chosen as the highest desirable mean temperature at which said at least one mold should operate;

determining in response to said comparing step how fast said machine speed for each of said sections can increase before said molds reach said optimum temperature level;

determining the least amount by which the speed of any one of said sections can increase; and increasing in response to said least amount determining step the speed of said glassware forming system by said least amount.

24. In a glassware forming system having a plurality of sections each having molds for forming glassware containers from molten glass, each of said sections operating in an interdependent timed sequence with respect to one another, the method of controlling the speed of said system comprising the steps of:

detecting the mean temperature of at least one mold for each of said sections, said mean temperature being an average temperature of said molds;

comparing said detected means temperature of said at least one mold for each of said sections with a predetermined optimum temperature level, said optimum temperature level being chosen as the highest desirable mean temperature at which said at least one mold for each of said sections should operate;

determining in response to said comparing step the minimum time required to complete a series of functions in the formation of said glassware containers by each individual section;

determining in response to said minimum time determination step the maximum time required to complete said group of functions for said glassware forming system from among said respective minimum times for each section; and varying in response to said maximum time determining step the speed of said glassware forming system to equal said maximum determined time duration.

25. In a glassware forming system including a plurality of sections each having at least one blank mold and at least one blow mold for forming glassware containers from molten glass, each of said sections operating in an interdependent timed sequence with respect to one another, a method of controlling the speed of said glassware forming system comprising the steps of:

detecting the temperature of at least one blank mold and at least one blow mold for each of said sections;

comparing said detected temperatures of said at least one blank mold and said at least one blow mold for each of said sections with predetermined corresponding optimum temperature levels, said optimum temperature levels for said blank and blow molds being chosen as the highest desirable temperature at which blank and blow molds should operate, respectively;

determining the change in time required to process said molten glass in said blank and blow molds in response to the comparison of said detected temperatures and optimum temperature; and varying the speed of said glassware forming system in response to the determined change in time for processing said molten glass in said blank and blow molds.

26. In a glassware forming system including a plurality of sections each having blank and blow molds for forming glassware containers from molten glass, said molten glass being converted to a parison in said blank mold by performing a first group of functions, said parison being formed into a glassware container in said blow mold by a second group of functions and said glassware container being positioned for transportation to an annealing lehr by a third group of functions wherein each of said sections operates in an interdependent timed relationship with respect to one another, a speed control system for controlling said glassware forming system comprising the steps of:

detecting the mean temperature of at least one blank mold and one blow mold for each of said sections, said mean temperatures being an average temperature of said blank and blow molds, respectively;

comparing said detected mean temperatures of said at least one blank mold and said at least one blow mold for each of said sections with a predetermined corresponding optimum temperature level for said blank and blow molds, said optimum temperature levels being chosen as the highest desirable mean temperature at which said at least one blank and blow mold for each of said sections should operate;

determining in response to said comparing step the time required to complete said first and second groups of functions; and varying the speed of said glassware forming system in response to said determining step by an amount corresponding to the relative change in timing required to complete said first and second groups of functions.

27. The method of claim 26 further comprising the steps of:

determining from said minimum times for completing said first and second groups of functions for each individual section the maximum time required for any section of said machine to complete said first and second groups of functions; and varying the speed of said glassware forming system by the amount said maximum time for completing said first and second groups of functions differs from the originally established time for completing said groups of functions.

* * * * *